No. 633,736. Patented Sept. 26, 1899.
L. SCHOONOVER.
SHEARS FOR CUTTING STALK TOBACCO.
(Application filed Feb. 27, 1899.)
(No Model.)
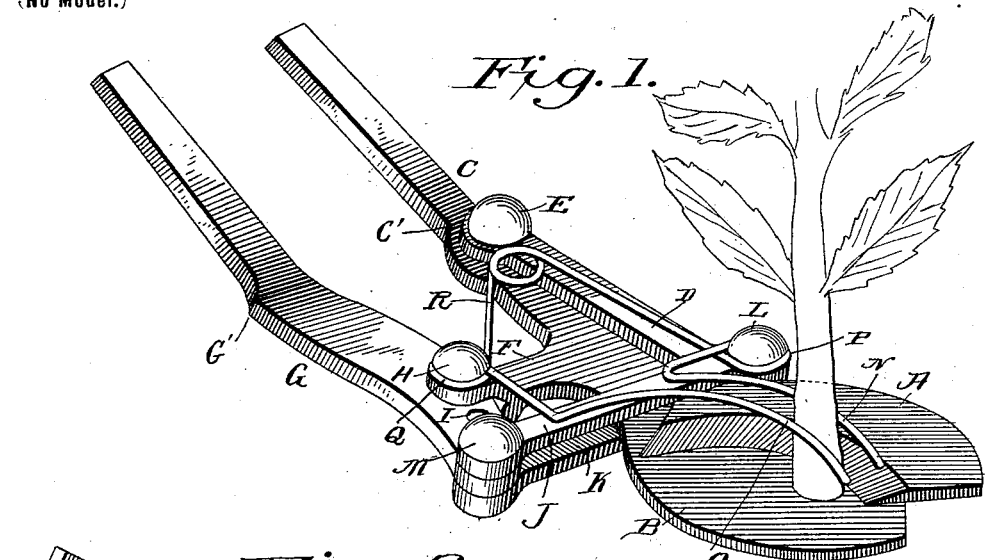
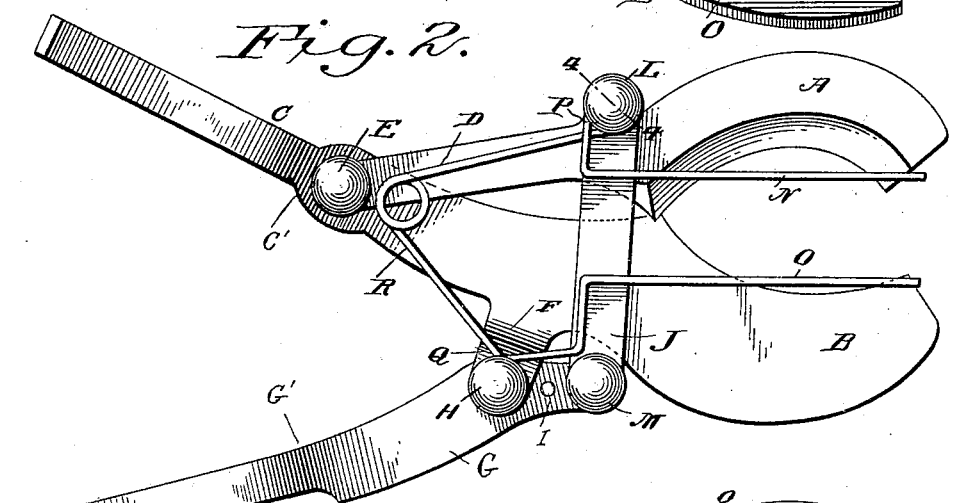
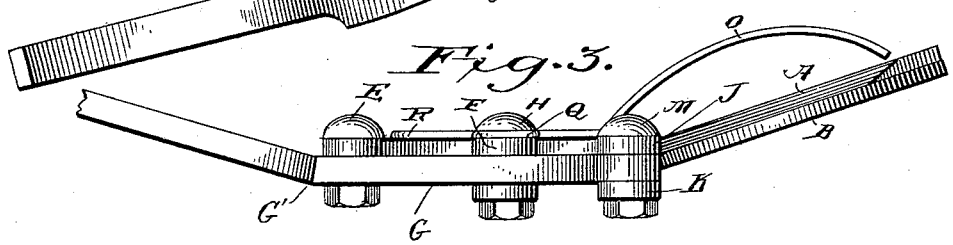
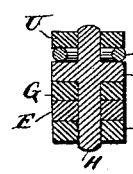
Witnesses
A. B. Deggis
M. F. Haskell
Inventor
Leon Schoonover
By O. E. Duff
Attorney
THE NORRIS PETERS CO. PHOTO-LITHO., WASHINGTON, D. C.

UNITED STATES PATENT OFFICE.

LEON SCHOONOVER, OF AUSTINBURG, PENNSYLVANIA.

SHEARS FOR CUTTING STALK-TOBACCO.

SPECIFICATION forming part of Letters Patent No. 633,736, dated September 26, 1899.

Application filed February 27, 1899. Serial No. 707,027. (No model.)

*To all whom it may concern:*

Be it known that I, LEON SCHOONOVER, of Austinburg, in the county of Tioga and State of Pennsylvania, have invented certain new and useful Improvements in Shears for Cutting Stalk - Tobacco; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates generally to shears for cutting off growing plants, but particularly to shears for cutting off tobacco-plants.

The primary object of my invention is generally to improve the construction and operation of such implements, and a special object is to provide a pair of shears of this class which shall greatly lighten the very laborious work of harvesting tobacco by so arranging the parts of the shears that the plants may be cut without the necessity of low stooping, the blades being shaped and arranged to perform the work readily and easily and provided with means for holding the severed plant, so that it may be laid aside in any desired position.

With these objects in view my invention consists in the improved construction, arrangement, and combination of parts hereinafter fully described and afterward specifically pointed out in the appended claims.

In the accompanying drawings, Figure 1 is a perspective view illustrating the practical operation of my invention, the shears being illustrated as closed, with the butt of the plant resting on one of the blades and the plant held upright by the spring-fingers. Fig. 2 is a top plan view showing the shears and spring-fingers open. Fig. 3 is a view in side elevation. Fig. 4 is a detail sectional view on the dotted line 4 4 of Fig. 2. Fig. 5 is a similar view showing a bolt of another form.

Like letters of reference mark the same parts in all the figures of the drawings.

Referring to the drawings by letters, A and B indicate the cutting-blades of my improved shears. It will be observed that these blades are of substantially crescent shape and their edges curved inward at each end, so that in the act of cutting the plant it is impossible for it to slip out between the outer ends of the two blades. The blade B, which is the under blade in operation, is made flat on its upper surface and of sufficient width to form a support for the butt of the plant severed from the stump or root.

The blade B forms part of a lever C, being made integral therewith, while the blade A is made integral with a lever D, pivotally connected to the lever C by means of a bolt E. A short arm F projects laterally to the right from lever C, being preferably formed integral therewith, at the outer end of which is pivotally connected or fulcrumed a lever G by means of a bolt H, said bolt when the parts are assembled being passed through either of the holes I in lever C, according to the leverage required, depending upon the work to be done.

J K indicate bars or links which connect the outer end of lever G and the lever D, said links being connected to said levers by bolts L M, the link J passing above and the link K below the lever C, thus serving as a guide to said lever C in operation and preventing the separation of the blades A and B vertically during the operation of cutting.

N and O indicate a pair of spring-fingers formed of a single piece of spring-wire which is bent at P and Q to form rings or coils to encircle the bolts L and H and at R to form a spring-coil, the coil being so bent as to tend normally to draw the spring-fingers, bolts L and H, and blades A B toward each other and hold the fingers and blades in their closed position.

The spring-fingers N and O are curved upwardly, so as to appear to lie substantially parallel when observed in plan view and to rise some distance above the cutting edges when seen in side elevation.

The bolts L and H, upon which the spring-fingers are mounted, may be ordinary bolts; but for some reasons the construction shown in Fig. 5 is to be preferred. In this instance the bolts are each formed with a central collar or head S and threaded at each end to receive nuts T and U, the nut T being below arm F, the head S above lever G, and the nut U above the coil Q, so that the arm and lever and the coil may be adjusted by means of the nuts independently of each other.

The levers C and G are bent at an obtuse angle upward, as at C' and G', so as to rise high enough at their outer ends to permit them to be grasped by a person in a standing position, while the blades A and B are in substantially horizontal position. These levers may be long enough to form the handles, or they may be provided with suitable wooden extension-handles, as may be desired.

In operation the handle-levers C and G are pressed apart, which will open the cutting-blades and spring-fingers, when the blades and fingers are carried forward on opposite sides of the plant to be cut. The levers are now brought together, cutting off the plant close to the ground, the spring R assisting materially in the operation and causing the plant to be grasped by the spring-fingers N and O at some distance above the blades and to be held upright, with its butt-end resting on blade B, when the plant may be laid aside in any desired position, being released by again opening the blades and fingers ready for cutting the next plant.

The advantages attending the use of my invention are numerous and obvious. With it the cutter is permitted to do his work while standing in substantially an upright position, thus avoiding the hardest work attending the cutting of tobacco—viz., the stooping to the ground to cut each plant. The leverage of the blades is such as to render the cutting easy, and the spring-fingers not only make it still easier, but also clasp and hold the plant in position to be laid aside as may be desired.

Having thus fully described my invention, what I claim as new, and desire to secure by Letters Patent of the United States, is—

1. The combination in tobacco-shears of blades having cutting edges curved outward between their heels and points, and fingers above the blades made of spring-wire curved upward so as to rest, some distance above the cutting edges, the wire being also connected to the levers of the stationary and movable blades in position to tend to maintain the blades and fingers normally in their closed positions, substantially as described.

2. The combination in tobacco-shears of a lever carrying a stationary blade, a second lever pivoted to the first and carrying a movable blade, an arm projecting from the first lever, a third lever fulcrumed at the end of said arm, a pair of links pivotally connecting the outer end of the third lever with the second lever between its fulcrum and its blade, and a pair of spring-fingers above the blades formed of a single piece of wire bent around the fulcrum-bolt of the third lever and the bolt connecting the links with the second lever, substantially as described.

3. The combination of the lever C carrying blade B, the lever D carrying blade A, the fulcrum-bolt E, the arm F projecting laterally from lever C, the lever G, the fulcrum-bolt H, the links L and K above and below lever C, the bolts L and M connecting the links with levers D and C, and the fingers N and O, made of a single piece of spring-wire, bent around the bolts L and H and coiled centrally at R, substantially as described.

In testimony that I claim the foregoing as my own I affix my signature in presence of two witnesses.

LEON SCHOONOVER.

Witnesses:
H. W. COLEGROVE,
A. G. INGHAM.